Aug. 2, 1966     R. E. FARNHAM     3,263,971
AUTOMATIC SAMPLING MEANS FOR ASPHALT PLANTS
Filed March 21, 1962     7 Sheets-Sheet 3

INVENTOR.
Robert E. Farnham
BY
ATTORNEYS

Aug. 2, 1966 R. E. FARNHAM 3,263,971
AUTOMATIC SAMPLING MEANS FOR ASPHALT PLANTS
Filed March 21, 1962 7 Sheets-Sheet 4

INVENTOR.
Robert E. Farnham
BY
ATTORNEYS

United States Patent Office 3,263,971
Patented August 2, 1966

3,263,971
AUTOMATIC SAMPLING MEANS FOR
ASPHALT PLANTS
Robert E. Farnham, Naperville, Ill., assignor to Barber-Greene Company, Aurora, Ill., a corporation of Illinois
Filed Mar. 21, 1962, Ser. No. 181,259
17 Claims. (Cl. 259—154)

This invention relates to a mixing plant composed of multiple units adapted for transportation over roads so that the plant can be placed in operation at any desirable central location.

More specifically, this invention relates to a bituminous mixing plant for producing binder coated aggregate mixes such as bituminized or asphaltic type road paving materials, which plant is equipped with a new and improved means for automatically extracting aggregate and asphalt samples from the plant while the plant is continuously operating so that the number of pounds of aggregate and asphalt per revolution of a reference shaft may be conveniently and accurately ascertained.

In the past, the calibration of the aggregate feeders on bituminous plant graduation control units has been a time consuming job involving considerable manual labor and lengthy arithmetical calculations. Former techniques of calibration have made it necessary that the machine be shut down at intervals while the aggregate feeder is being calibrated. To calibrate a feeder of previous types of graduation control units, the control gate is set at some convenient opening. The machine is run for a few seconds to establish full flow, then stopped. A reading is taken of a revolution counter attached to some reference shaft. The machine is run until a convenient amount of material has been discharged into a sample container. The machine is then stopped and another reading of the revolution counter on the reference shaft is taken. The material in the bucket is then weighed and this weight is divided by the number of revolutions which the reference shaft has turned. This figure gives the pounds per revolution delivery of the feeder at that particular gate opening. The entire procedure is repeated once or twice and the results averaged for greater accuracy. Additional tests are run at other gate openings and similarly averaged. These are then plotted on a graph and the graph is then used in establishing the gate openings needed to deliver the amount of material required in the mix.

After setting the gates, the delivery rate must be checked; and during operation, additional checks are made to insure that the rate has not changed. All this involves considerable handling of material and innumerable calculations.

Similarly, on the mixer of a continuous asphalt plant, a manual valve is normally provided in the asphalt piping between the metering pump and the spray bar. By means of this valve, asphalt is pumped into a container and then weighed, readings of the revolution counter on the reference shaft are taken before and after, and the calculations are performed to determine the rate of flow in pounds per revolutions.

The present invention simplifies calibration in a number of ways as hereafter set forth. (1) The number of revolutions to be delivered can be pre-set on a dial. In most cases, this will be one revolution. The amount of material delivered will then be pounds per revolution directly without any division. If larger samples are needed for greater accuracy, the operator can choose any convenient number of revolutions, which simplifies the calculations by enabling him to divide by a convenient integer rather than by a three digit figure. (2) the automatic controls greatly simplify the actual work involved in taking a sample, and it becomes more convenient and faster to adjust the gate by trial and error rather than taking all the samples needed to construct a graph. (3) This greatly reduces the amount of material handling involved. Ten or twelve samples of each size aggregate or material were formerly required to construct a suitable graph, and now only three or four trials are required on a trial and error basis with the new sampling method. (4) This invention makes it possible to extract an accurate sample from the flow of material during operation without having to stop the machine.

It is therefore an important object of this invention to provide an improved bituminous mixing plant in which aggregate and asphalt samples can be taken automatically with a minimum of effort without shutting down the operation of the plant.

Still another important object of this invention is to provide a bituminous mixing plant with a new and improved gradation control unit having electrical control means including a dial control enabling the number of revolutions to be pre-set whereby aggregate and asphalt samples can be accumulated in sample hoppers whereby the amount of material delivered will be pounds per revolution directly without any division.

According to the general features of this invention there is provided an aggregate graduation unit for a bituminous mixing plant including a feeder head shaft with a discharge hopper mounted thereunder and with the hopper having discharge and test chutes as well as an aggregate flow diverting test gate disposed between the chutes at right angles with respect to the feeder head shaft and vertically in line with a center line through the feeder head shaft, the gate further having a hydraulic cylinder with a double ended ram to provide equal displacement and consequently equal velocity in either direction for moving the test gate back and forth in a uniform manner for opening and closing the chutes. Electrical control means is operatively connected to the cylinder to enable aggregate to be delivered through the test chute.

Still another object of this invention is to provide a new and improved bituminous mixing plant incorporating an automatic system for taking aggregate and asphalt samples while the plant is being operated continuously and so that material handling may be greatly reduced.

This invention contemplates other and more specific objects, features and advantages which will become fully apparent from the following detailed description taken in conjunction with the accompanying drawings which illustrate a preferred embodiment and in which:

FIGURE 9 is a plan view of the aggregate discharge hopper; and

FIGURE 10 is a perspective view of the aggregate discharge hopper.

As shown on the drawings:

Figure 1:
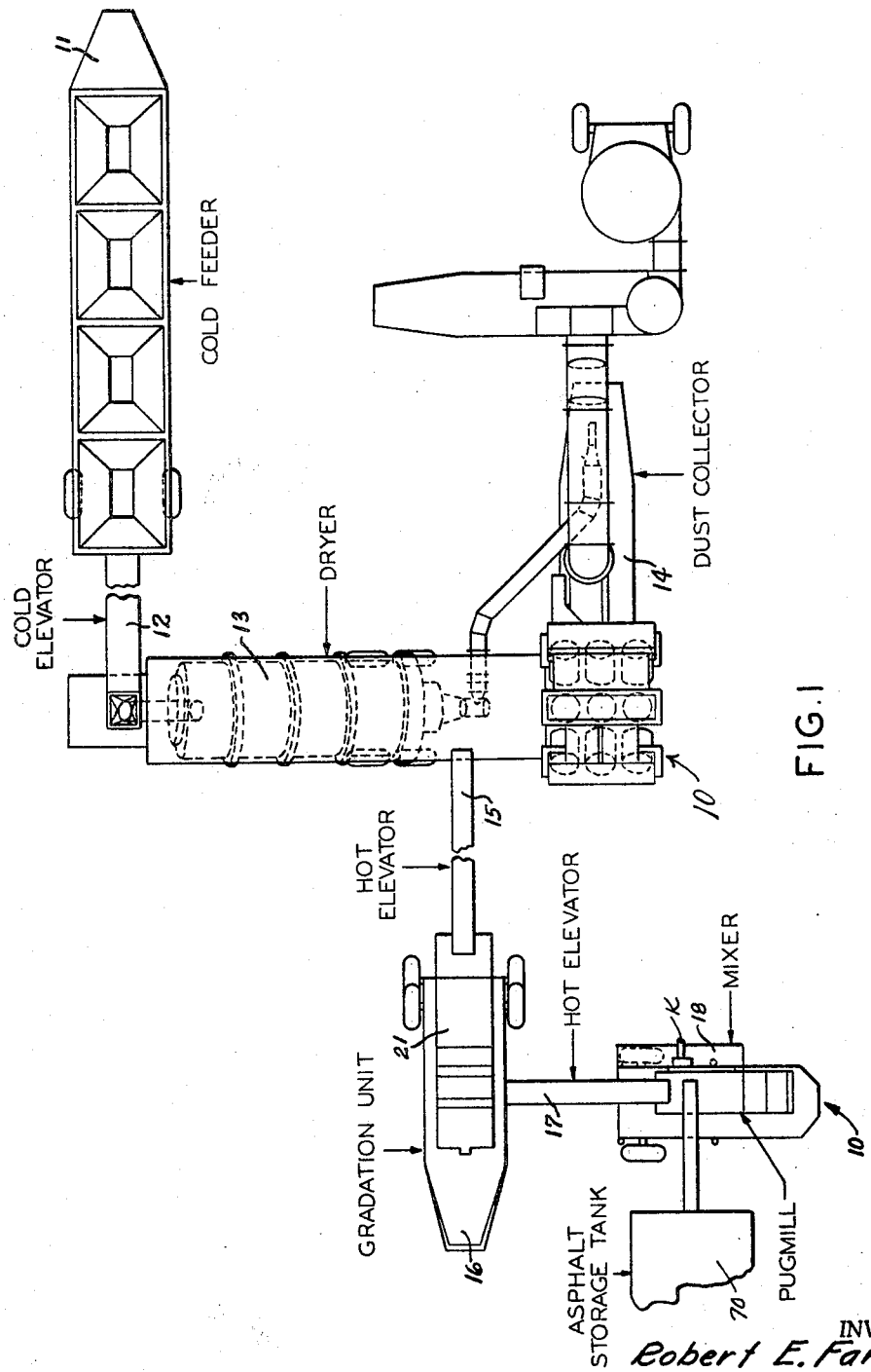
FIGURE 1 is a diagrammatic view of a bituminous mixing plant constructed in accordance with the principles of this invention.

As best shown in FIGURE 1, a mixing plant 10 includes a mobile cold feeder 11, a cold elevator 12, a mobile rotary drum dryer 13, a mobile dust collector 14, a hot elevator 15, a mobile gradation control unit 16, a second hot elevator 17, and a mobile mixer 18. Broadly speaking, the operation of the mixer plant 10, which is of the continuous type is of the type described in the Barber Patent 2,344,228. It further will be appreciated that a continuous type mixer plant operates on a different principle than the batch plant in that the apron feeder drive shaft as well as the elevators and the pump drive shaft for supplying aggregate and asphalt to the pug mill are interlocked and operate continuously in such a way that the aggregate being delivered to the pug mill is precoated by a spray bar with the metered asphalt enabling the aggregate to be more uniformly coated in the easiest possible manner. It will therefore be appreciated that one of the main differences between a continuous mixing plant and a batch plant is that in a continuous plant one batch after another is produced without interruption.

According to certain features of the present invention, a new and improved discharge hopper 20 is provided on a gradation unit 16. The gradation unit 16 further includes screens (not shown) as well as a series of aggregate bins (not shown). The aggregate bins each have an adjustable gate and generally four bins are provided each having a gate. These bins contain different grades of aggregate and the gates are calibrated to enable the different grades of aggregate to be correctly proportioned with respect to one another in the production of the mix. The aggregeate bins are provided with apron feeders (not shown) for conveying the different types of aggregate in separate streams to the discharge hopper 20.

Figure 3:
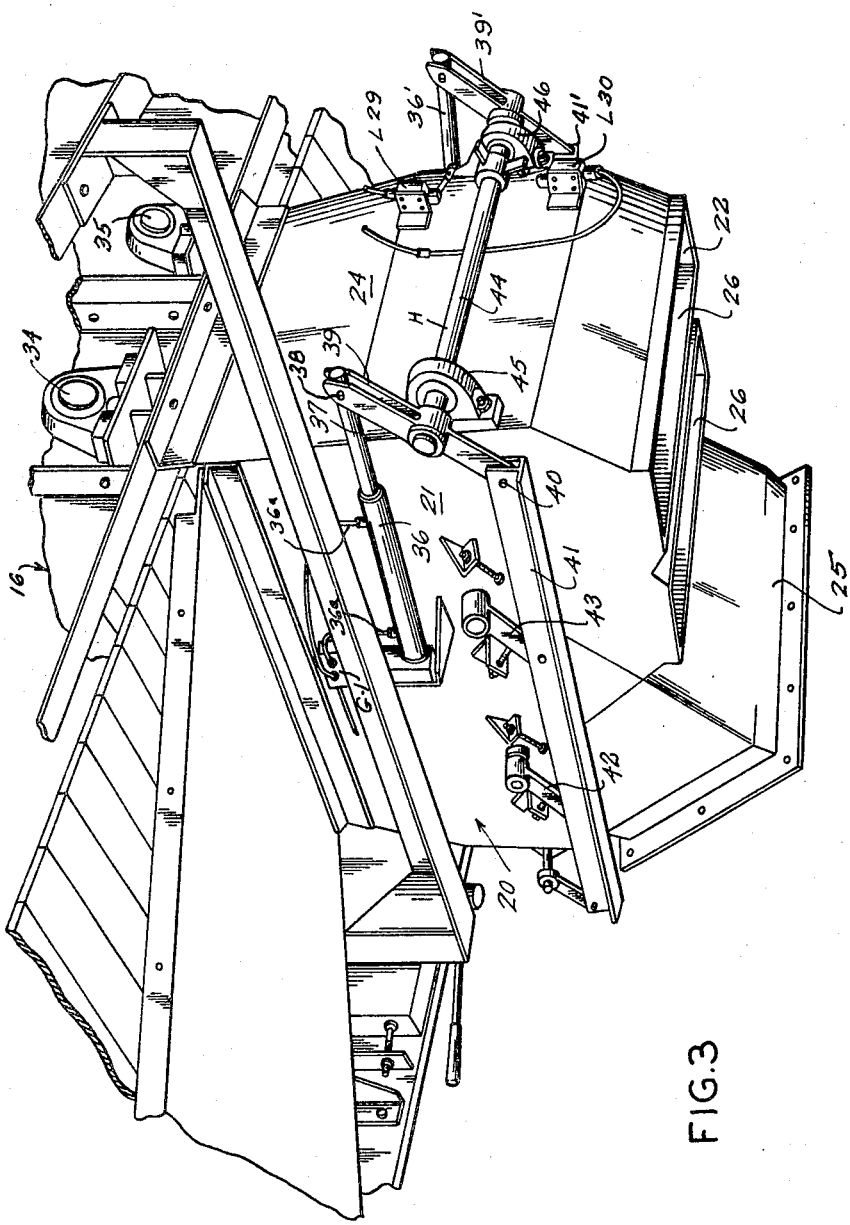
FIGURE 3 is a fragmentary perspective view of the gradation unit and more particularly of the aggregate discharge hopper.
Figure 4:
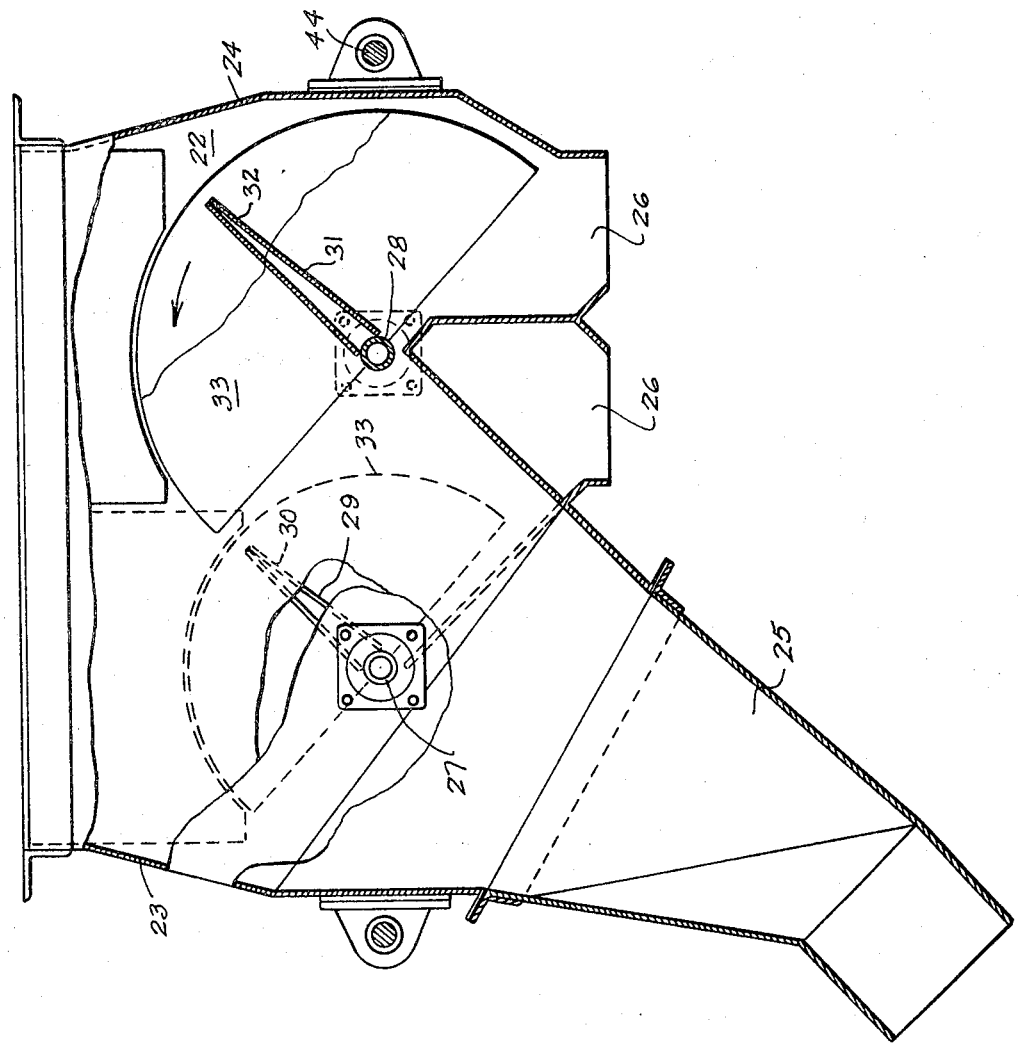
FIGURE 4 is a vertical section through the aggregate hopper shown in FIGURE 3.

As shown in FIGURES 3 and 4, the hopper 20 has side walls 21 and 22 as well as end walls 23 and 24. Mounted at the lower end of the hopper 20 is an aggregate discharge chute 25 as well as aggregate test chutes 26, 26. The discharge chute 25 supplies aggregate to the hot elevator 17 leading to the mixing unit 18.

Extended transversely between the side walls are pairs of gate pivot shafts 27, 227 and 28, 228 mounted on suitable bearings (not shown). Mounted on each of the pivot shafts are the test gates which gates are indicated at 29, 30, 31 and 32. The gates are separated from one another by means of a series of vertically extending semi-circular baffles as are indicated at 33 whereby the discharge hopper is divided into a series of separate aggregate receiving compartments each having its own gate as identified above.

From a consideration of FIGURE 4, it will be appreciated that when the gates 29–32, inclusive, are in the positions illustrated, that the aggregate dropped from the overhead feeders mounted on feeder head shafts 34 and 35 (FIGURE 3) that the material will flow from each of the compartments in the discharge hopper 20 into the aggregate discharge chute 25. When the gates 29–32 are rotated 90° in a counterclockwise direction as indicated by the arrow in FIGURE 4, the aggregate flowing into the aggregate compartments in the discharge hopper 20 is caused to flow through the test chutes 26, 26. The aggregate flowing over the gates 29 and 30 will flow through the left-hand chute 26 while the aggregate flowing over the gates 31 and 32 will flow through the right-hand chute (FIGURE 4).

To eliminate the problem of uneven division of material between the hot elevator 17 and the hopper 20 during the finite time interval, the gates are in motion, the gate pivot shafts 27 and 28 are at right angles to the feeder head shafts 34 and 35. It will further be appreciated that the gates 29–32 must move through the flow of aggregate material at a constant velocity in each direction. To this end, a hydraulic ram 36 has a piston rod 37 pivotally connected at 38 to one end of a pivotal arm 39. An opposite end of the arm 39 is pivotally connected at 40 to a swing bar 41. The swing bar has swing bar arms 42 and 43 which are fastened to the gate pivot shafts 27 and 28, so that when the swingable arm is rocked in one direction, the gates are swung so as to permit the aggregate to flow into the chute 25 and so that when the swingable arm is rocked in an opposite direction, the aggregate is permitted to flow through the test chutes 26, 26. The swingable arm 39 is connected intermediate its opposite ends to a rock shaft 44 and it will be noted that the rock shaft 44 is journaled on bearings 45 and 46. The opposite end of the rock shaft 44 is connected to another pivotal arm 39' and this pivotal arm is secured at its lower end with another swingable arm 41' which is identical to and operates in the same manner as the swingable arm 41, already described. The hydraulic cylinder 36 has a ram which comprises a double-ended unit to provide equal displacement and, consequently, equal velocity in either direction of movement in the cylinder. As shown in FIGURE 3, a second ram 36' is mounted on an opposite side of the hopper 20 and connected to the pivotal arm 39'.

Figure 2:
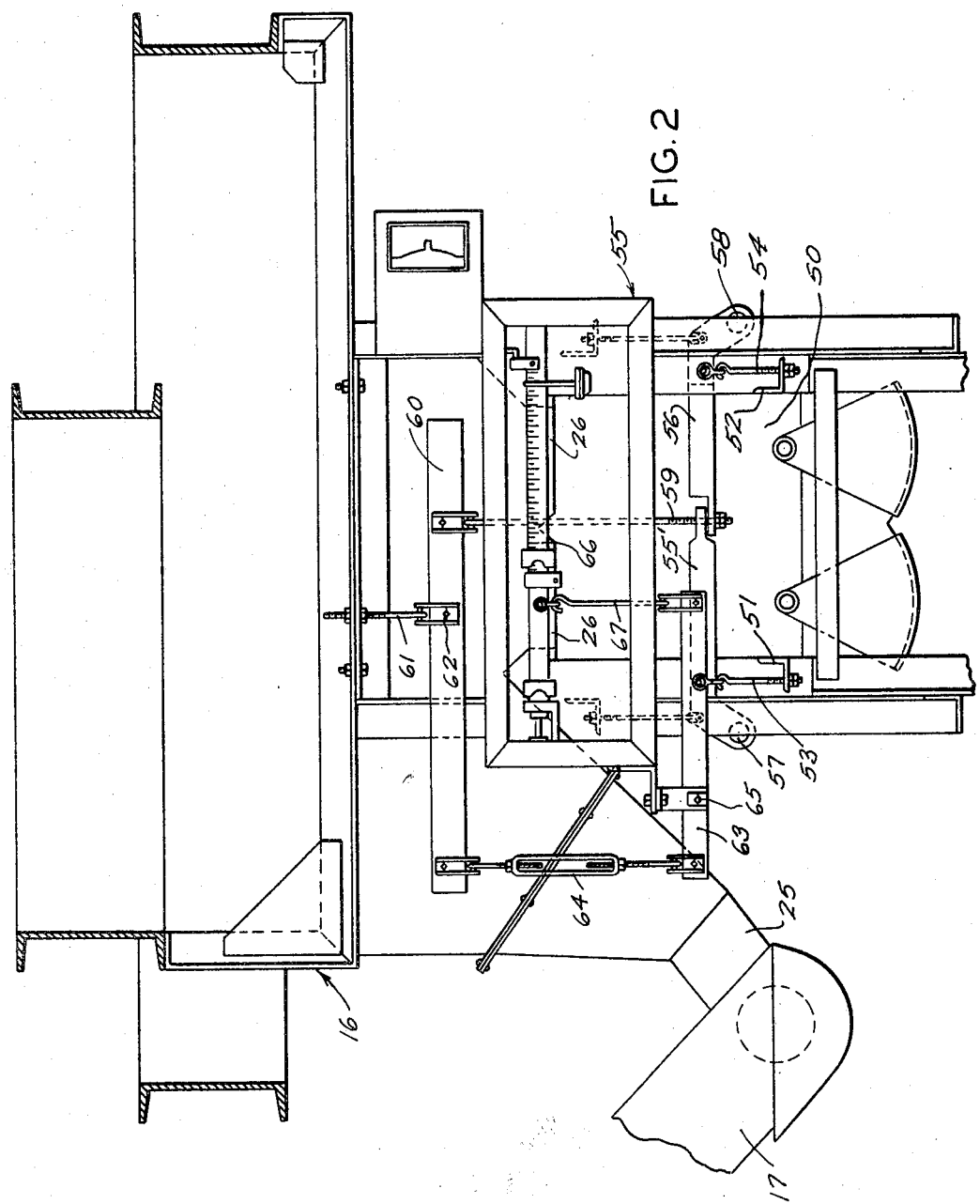
FIGURE 2 is an enlarged fragmentary side view of a gradation unit with its aggregate sample hopper mounted on a scale.

In order to weigh the sample of aggregate flowed through the test chutes 26, 26 into an aggregate sample hopper 50, the hopper 50 is mounted on a beam type scale indicated generally at 55 in FIGURE 2. To this end, the sample hopper 50 has a pair of brackets 51 and 52 which are secured to the hopper. Attached on the brackets 51 and 52 are a pair of hooks 53 and 54 which are suspended from a pair of scale beams 55' and 56. The scale beams 55' and 56 are pivotally mounted at 57 and 58 on the gradation unit. Adjacent ends of the scale beams 55' and 56 are joined together by a vertical rod 59 at its lower end, the upper end of the rod 59 being secured with an upper scale beam 60. The scale beam 60 is suspended from the gradation unit by means of a hook 61 intermediate its opposite ends. On an opposite side of the upper beam pivot 62 the upper beam is connected to a lower beam 63 by means of a clamp 64. The lower beam 63 is pivoted at 65 on the gradation unit frame. On an opposite end of the lower beam, the lower beam is suspended from a scale bar 66 by means of a hook 67. It will be noted that the scale bar 66 has conventional weights and units of measurements carried thereon so that when a load is placed in the sample hopper 50, the scale beams 55 and 56 are drawn downwardly with the result that the upper beam 60 is rocked on its pivot 62 to cause the lower beam 63 to be rocked on its pivot 65 to cause a downward force reaction on the scale bar 66 through the hook 67. The scale may be operated in a more or less conventional manner to ascertain the weight of the aggregate in the sample hopper 50.

After the aggregate is unloaded from the discharge hopper chute 25 into the hot elevator 17, it is carried to the mixer or pug mill 18. As the aggregate is unloaded into the pug mill 18, asphalt is sprayed onto the aggregate by means of an asphalt spray system 70 (FIGURE 7) and more particularly through an asphalt spray bar 71. The asphalt spray system 70 includes an asphalt storage tank 72. Asphalt in the tank 72 is flowed through asphalt line 73 to a transfer pump 74 which pumps the asphalt through an asphalt line 75 to a strainer 76. The asphalt is flowed through the strainer and asphalt pipe 75 to a metering pump 77 and then through asphalt lines 78, 79 and 80 to the spray bar 71. A series of valves is provided in the system 70 for assisting in its operation and these will be discussed in detail in connection with the discussion of the operation of the plant 10.

*Operation*

Figure 6:
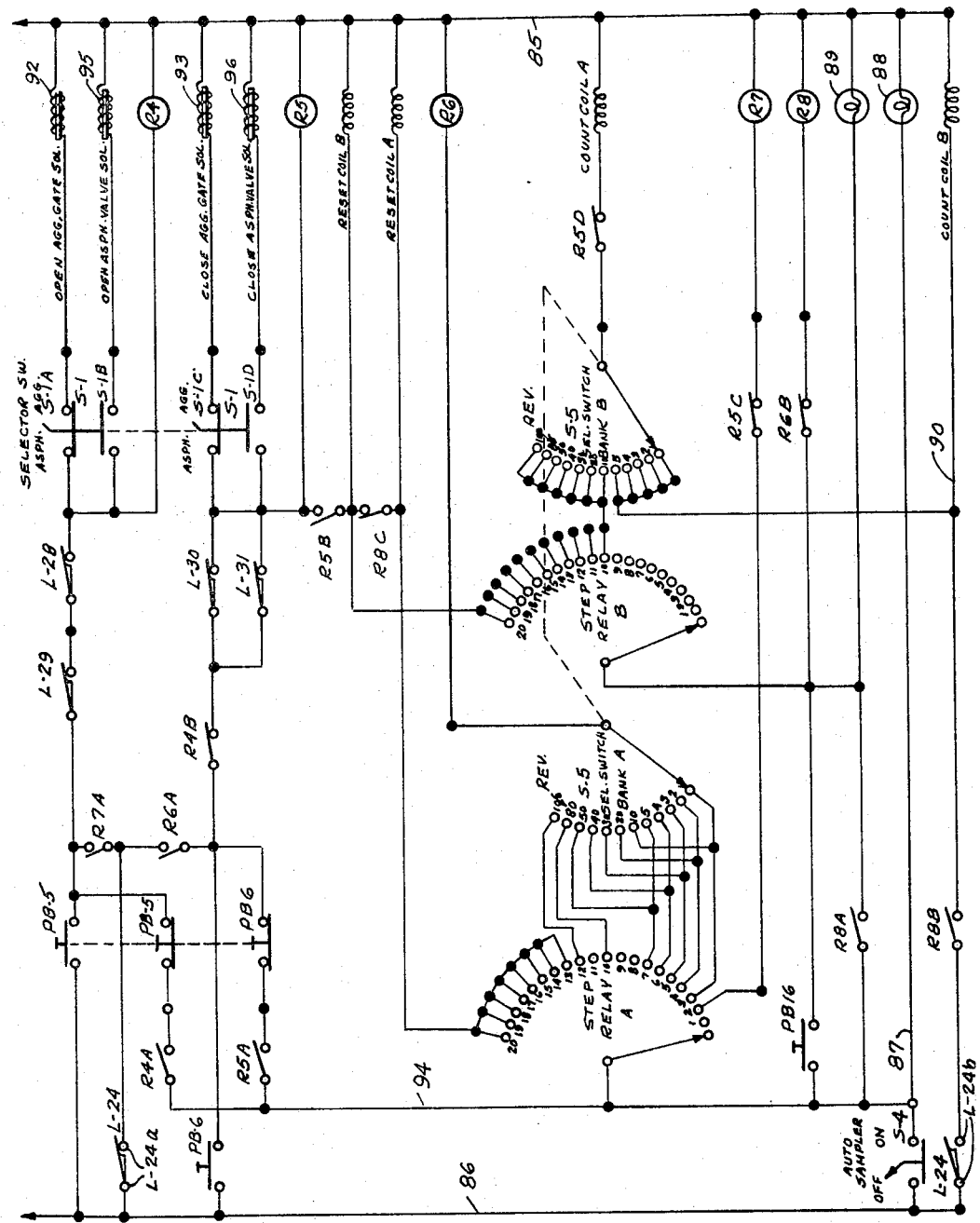
FIGURE 6 is a schematic diagram of an electrical system used in the calibration of the aggregate and asphalt being delivered to the pug mill.

At the outset, it will be appreciated that the contacts in FIGURE 6 shown in an open position are normally open while the contacts shown closed are normally closed. For instance, L30 and L31 limit switches are shown on the schematic as closed. These are the normally-closed sets of contacts in these switches, but as installed in the machine the switches are actuated by the gate drive linkage, and these contacts will be held open.

Before taking a sample with the automatic sampler, all relay and switch contacts will be open or closed as shown in FIGURE 6, except L30 and L31 which will be held open by the aggregate gate and asphalt valve respectively, indicating to the electrical circuits that the gate and the valve are *closed*. This is defined as being closed to the weigh buckets, but open to the operating circuits, directing the flow of aggregate to the elevator 17 to the mixer 18, and the flow of asphalt to the spray bar in the pug mill. Also the count switch L24 is being actuated and released repeatedly and continually by the cam on the reference shaft K. Therefore, both sets (NO and NC) L24a and L24b of count switch contacts of L24 will be alternately opening and closing. When contacts L24a are closed, contacts L24b will be open. When contacts L24a are open, contacts L24b will be closed.

In this initial position, we will assume that lines 85 and 86 to the 110 v., 60 cycle supply, are energized, but because of the switch, push-button, and relay positions all coils, pilot lights, and solenoids are de-energized.

To take a sample of aggregate corresponding to the amount of aggregate discharged into hopper 20 during one revolution of reference shaft K turn on the sampling circuit by means of switch S4. The drawing shows the switch handle corresponding to the arrow pointing to "OFF" and the contacts open. By flipping the switch handle (FIGURE 6) to "ON," the contacts will close thereby energizing wire 87 and the "AUTO-SAMPLER ON" pilot light 88 goes on, but nothing else is energized. Then turn the function selector switch, S1, to "AGG." This is a two-block switch with two sets of NO and two sets of NC contacts. When the switch S1 is set on "AGG," contacts S1–A and S1–C are closed and contacts S1–B and S1–D are open. Turn the "NUMBER OF REVOLUTIONS" selector switch, S5 to "1." Both banks of this switch move together, and contact will be made as shown on the schematic drawing.

The above *three steps* may be performed in any sequence and the system is commonly left in this condition.

Before proceeding, the mixer 18, the elevators 15 and 18, and the feeders must be running. There would be no counts unless the mixer 18 is running so as to turn the reference shaft K. The operator then presses the push button PB–16, labeled "START CHECK." This is the last manual operation required for all subsequent operations are automatic, *timed by the count switch L24* as actuated by shaft K. As push button PB–16 closes, the "CHECKING" pilot light is energized, and lights up. Also, through contact R6B–NC, a circuit is completed to energize coil R8. All sets of contacts on relay R8 reverse position, contacts R8A and R8B close, and relay R8C opens. Contacts R8A now provide a circuit by-passing push button PB–16 so that coil R8 and "CHECKING" light 89 will remain energized even after push button PB–16 is released, opening contacts on PB–16. If the contacts L24b on count switch L24 are open when R8B contacts close, nothing happens. If the contacts 24b on the count switch L24 are closed, or when they close next, a circuit is completed to energize count coil B. The movable contact of step relay B advances one step, to position 1. Since there is no wire attached to this contact, nothing happens. At the same time a circuit is completed through L24, R8B, through wire 90, switch S5 "B" (bank "B" of selector switch S5) and R5D, to energized count coil "A." The movable contact of step relay A then also advances one step, to its position 1. Again, since there is no wire attached to this contact, no circuit is completed and nothing happens. In this way the first count is discarded because push button PB–16 could have been pressed at any time during the period the contacts 24b on the count switch L24 are closed as well as while they were open. Note that if selector switch S5 is set at any number of revolutions of 5 or less, both step relays will step together.

As the reference shaft K and its cam 91 continue to rotate, count switch L24 is released. The limit switch contacts L24a open and the limit switch contacts L24b close, but as contacts R6A and R7A are still open, no circuits are completed. One revolution later, count switch L24 is again actuated, closing contacts L24b. Again both step relays A and B advance together one step as described above, this time to position 2. Again no circuit is completed through step relay "B," but at position 2 step relay A completes a circuit through contacts R5C to energize the coil R7. Relays A and R7 will remain in this condition for one full revolution until another incoming count moves the contact arm of step relay A. As coil R7 is energized, contacts R7A close. This sets up a circuit which is completed a fraction of a revolution of shaft K later, when the cam 91 releases count switch L24 and contacts on limit switch L24 close. Coil R4 now becomes energized through L24a, R7A, L29 and L28. As relay R4 operates, contacts R4A close and, in series with PB5, by-pass contacts R7A to hold coil R4 energized. Contacts R4B open to prevent accidental premature operation of the circuit in which they are located. As coil R4 is energized, the OPEN AGG. GATE SOL. 92 is also energized through selector switch controls S1–A. This solenoid 92 moves the spool in hydraulic valve G1, to direct hydraulic oil to ram 39 which drives the gate drive linkage H to open the gates 29–32. Any gates 29–32 which have been coupled to this linkage will also be carried to an "OPEN" position. As the linkage moves, it releases limit switch L30, and contacts L30 will close, but at this point no circuits are completed. As the ram 39 reaches the end of its stroke, the linkage H actuates limit switch L29 opening contacts L29. This de-energizes the OPEN AGG. GATE SOL. 92 permitting a spring-loaded spool in valve G1 to return to its neutral position and the ram 30 stops. Relay R4 coil is also de-energized, opening contacts R4A to break its holding circuit, and closing contacts R4B. At this point the gates 29–32 are in full open position, diverting the flow of material from its associated feeder into the weigh hopper 50. The reference shaft K continues to rotate, and again actuates the count switch, L24, closing contacts L24b and opening contacts L24a. As before, both steps relays A and B advance one step to position 3. At this position, step relay B still does nothing but the contact arm of step relay A completes a circuit through relay wire #50 and Bank A of selector switch S5, to energize relay R6 coil. As the contact arm leaves position 2 it breaks the circuit to coil R7. Contacts R7A open. When R6 coil is energized, contacts R6a close and contacts R6B open. The opening of R6B deenergizes coil R8 which opens contacts R8A and R8B, and closes contacts R8C. The opening of contacts R8A breaks the holding circuit for coil R8 and the CHECKING pilot light 89. The opening of R8B prevents any further counts from reaching the count coils of step relays A and B, which remain at position 3. As reference shaft K rotates another fraction of a revolution, its cam 91 releases limit switch L24. Contacts L24b open. Contacts L24a close, completing the circuit through R6A, R4B and L30 to energize relay coil R5, and also through selector switch contacts S1–C to energize the CLOSE AGG. GATE SOL. 93. As coil R5 is energized, it closes contacts R5A to set up its holding circuit as was described for relay R4 previously. Contacts R5B close, which energizes rest coil "B" and, through contacts R8C, reset coil "A". Energizing these reset coils releases a pawl on each step relay A and B which permits the contact arm to return to its initial position, position 0. This breaks the circuit to relay coil R6 which opens contacts R6A and closes contacts R6B. Also as coil R5 is energized, contacts R5C and R5D open. During automatic operation the normally closed contacts on relay R5 do nothing except provide a current path as they are installed in these positions only to prevent any possible damage during manual operation of the gates which will be later described herein.

As contacts L24a close, energizing the CLOSE AGG. GATE SOL. 93, note that *exactly* one revolution of reference shaft K, has elapsed since the previous closing of L24 energized the OPEN AGG. GATE SOL 92. The CLOSE AGG. GATE SOL. now operates the valve G1 to operate ram 37 to return the gate drive linkage H, to its original, or closed position carrying with it the gates 29-32, that are coupled to it. As the linkage starts to move it releases limit switch L29, closing contacts L29. As the ram 37 reaches the end of its stroke, with the gates in the closed position, the linkage H actuates limit switch L30. Contacts L30 open, de-energizing coil R5, reset coils A and B and the CLOSE AGG. SOL 93. When, coil R5 is de-energized, contacts R5A and R5B open, and contacts R5C and D5D close.

At this point the check is complete. The gate or gates 29-32 have been held open for exactly one revolution, and then closed. Both Step relays A and B have been reset to their original positions, and all other components have been returned to the condition existing immediately prior to pressing push button PB-16 to start the check. At this point the sample taken is weighed, then discarded. A second sample may now be taken immediately merely by pressing the "START CHECK" button PB-16, once more, or the circuit may be turned off by means of switch S4.

To take a large sample of two revolutions, the same sequence of operation holds, except that before starting the check the NUMBER OF REVOLUTIONS selector switch, S5, would be set on 2, for 2 revolutions. The sample gate opens when step relay A has reached its position 2, as before, but does not complete the circuit to coil R6 to start the gate closing sequence until it has reached its position 4, two revolutions after opening the gate. Operation for five or less revolutions would be similar.

If a sample size corresponding to 10 or more revolutions is desired, the NUMBER OF REVOLUTIONS, selector switch S5 would be set accordingly at 10, 20 or more revolutions. The difference between operation now and that described for one revolution is that impulses now created by the repeated opening and closing of count switch contacts L24b will register only on the count coil of step relay "B" and not on count coil "A". At the tenth count registered on step relay "B" its contact arm, reaching position 10, completes a circuit through selector switch S5 bank B, through contacts R5D to energize count coil "A". Step relay "A" then advances one step, to its position 1. At the same time, the contact arm on step relay "B" completes the circuit to reset coil B. (R5B and R8C will both be open at this point, from the previous description.). Energizing reset coil B returns the contact arm of step relay B to its original starting position. Each following count from count switch L24b again advances step relay B one step until again at the tenth count it will again advance step relay A by one step and simultaneously reset itself. In this way step relay A advances one step for each 10 counts from the count switch L24. Each successive step of step relay A triggers the same operations as previously described. In this way the AUTO-SAMPLER or electrical control means may be set for sample sizes of up to 100 revolutions.

Occasionally the operator would want to swing one or more gates, 29-32, to the OPEN position and leave them there for a period of time. This may be for various reasons, but would commonly be done at the end of day when cleaning out the aggregate bins over the feeders. For this purpose push buttons PB5 and PB6 have been added to the circuit. They would normally be used only when the AUTO-SAMPLER OFF-ON switch S4 is turned off. Pressing button PB5 closes contacts PB5, energizing the OPEN AGG. GATE SOL. 92 and thereby, through the hydraulic circuits, opening the sample gates 29-32. Relay R4 coil is also energized, opening contacts R4B and thereby preventing operation of the CLOSE AGG. GATE SOL. 93 at the same time in case PB6 were accidentally pressed also. Contacts R4A close, but the opening of contacts PB5 with the pressing of button PB5 prevents any feed back of power to wire 94 and other portions of the automatic circuit. Similarly, pressing button PB6 will energize the CLOSE AGG. GATE SOL. 92 to close the gates 29-32. In either opening or closing of the gates, the associated limit switch, L29 or L30, will cut off electrical power to the solenoid when the ram 39 has reached the end of its stroke.

Figure 7:
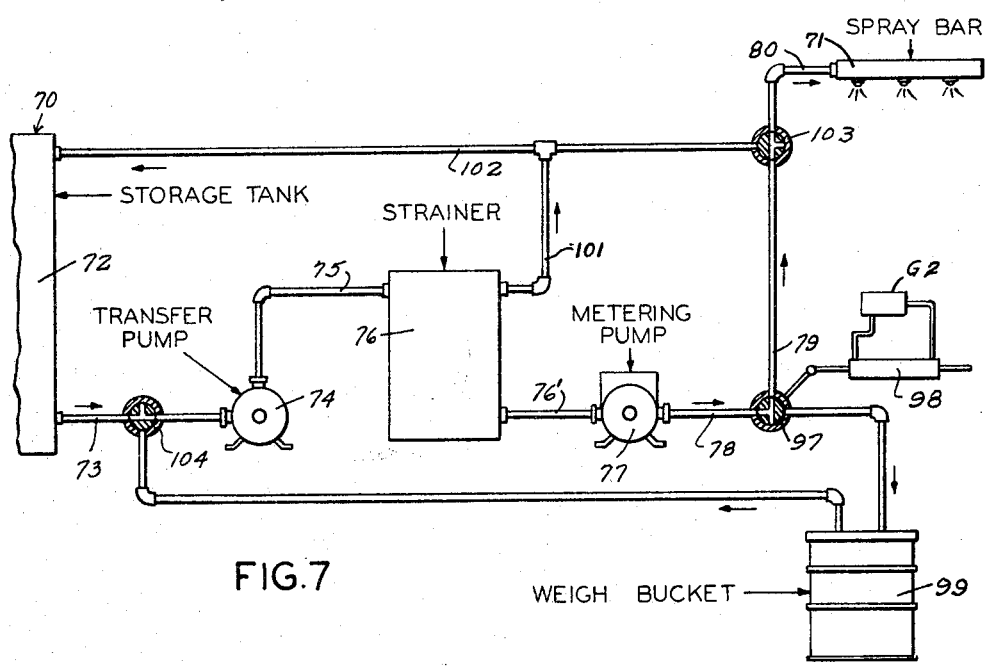
FIGURE 7 is a schematic diagram of the system for delivering asphalt to a pug mill as well as for taking an asphalt sample.
Figure 8:
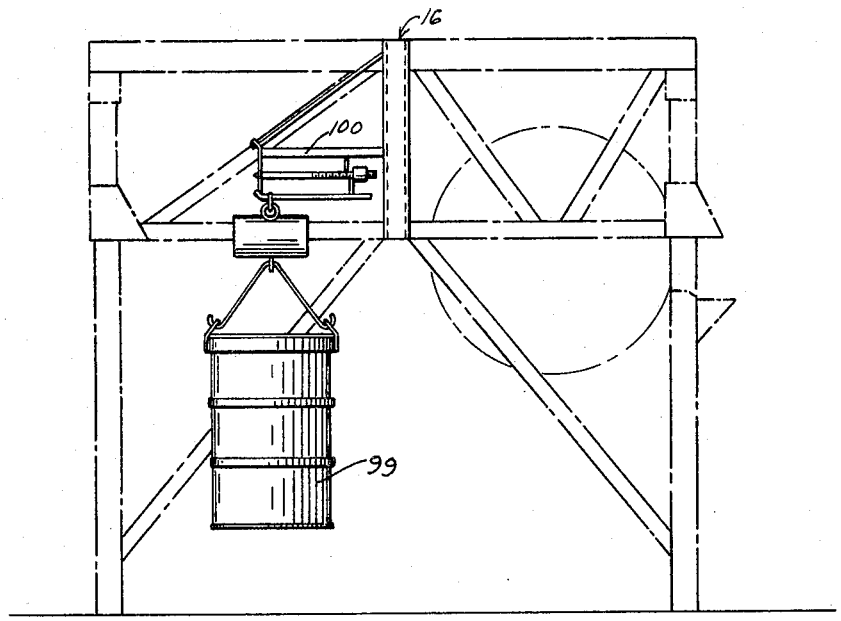
FIGURE 8 is a side view of an asphalt weigh bucket and a scale mounted on the gradation unit.

Asphalt samples are taken in exactly the same manner, and with the same sequence of operations, as has been described for aggregate. The only differences would be that the ASPH.-AGG. selector switch S1 would be turned to ASPH., closing contacts S1-B and S1-D, and opening contacts S1-A and S1-C. Then, OPEN ASPH. VALVE SOL. 95 operates instead of the OPEN AGG. GATE SOL. 92 in the foregoing discussion, and the CLOSE ASPH. VALVE SOL. 96 operates instead of the CLOSE AGG. SOL. 93 for the purpose of operating the hydraulic ram 98. Also, limit switches L28 and L31 would be operated instead of limit switches L29 and L30 respectively, but with exactly the same results. The limit switches L28 and L31 are operated by an extension on the actuating lever arm of the valve 97. The action is quite similar to the actuating limit switches L-29 and L30 shown in FIGURE 3. Thus, the ram 98 (FIGURE 7) pulls the lever arm mounted on the stem of the valve 97. The valve 97 rotates through 90° and an extension of the lever arm contacts the limit switch. Asphalt valve 97 is used in the asphalt flow similar to the usage of the aggregate gates 29-32 in the aggregate discharge from the feeder. The valve 97 is moved by the hydraulic ram 98 diverts asphalt from its normal flow path into an asphalt weigh bucket for the number of revolutions preset on selector switch S5. The ram 98 is controlled by the valve G2 which, in turn, is controlled by the solenoids 95 and 96. The valve G2 comprises an assembly that includes a valve body and the solenoids are mounted on either end and this assembly is commonly thought of as a single unit, as illustrated in FIGURE 7.

The bucket 99 is mounted on a scale carried on the frame of the gradation unit to enable the asphalt sample to be quickly weighed.

In the operation of the asphalt circulating system, the transfer pump 74 draws asphalt through the suction line 73 and forces it through the strainer 76 with the asphalt flow returning to the storage tank through the return lines 101 and 102. The variable-volume metering pump 77 withdraws a portion of the flow from the strainer 76 and by means of a manual valve 103 either pumps this portion to the asphalt spray bar 71 in the mixer or recirculates it back to the storage tank through the fluid line 102.

When an asphalt sample is taken, the valve 97 is operated by the hydraulic ram 98, as previously described in connection with the description of the electrical control means for taking the aggregate sample. The asphalt from the metering pump 77 is then deposited in the asphalt weigh bucket 99, as previously described. At the end of the preset number of revolutions as described under aggregate sampling, the valve 97 is returned to its original position. After the bucket is weighed, the asphalt in the bucket may be withdrawn therefrom by manually turning valve 104 so as to use the transfer pump 74 to draw the asphalt from the bucket.

It will be appreciated that the asphalt content of most mixes is quite low and that a sample of only one or two revolutions of the reference shaft K would be small. Accordingly, the counting circuit should be capable of being set for at least twenty revolutions, and frequently a setting at fifty or one hundred revolutions is employed. In this respect it will be appreciated that the flow characteristics through commercially available valves, during the time the valve is being moved from one position to the other, and the coating of the fluid lines with asphalt, results in a slight error in the sample being weighed. Where a large sample is taken of one hundred pounds, for example, the percentage of error is materially reduced to an acceptable figure.

Figure 5:
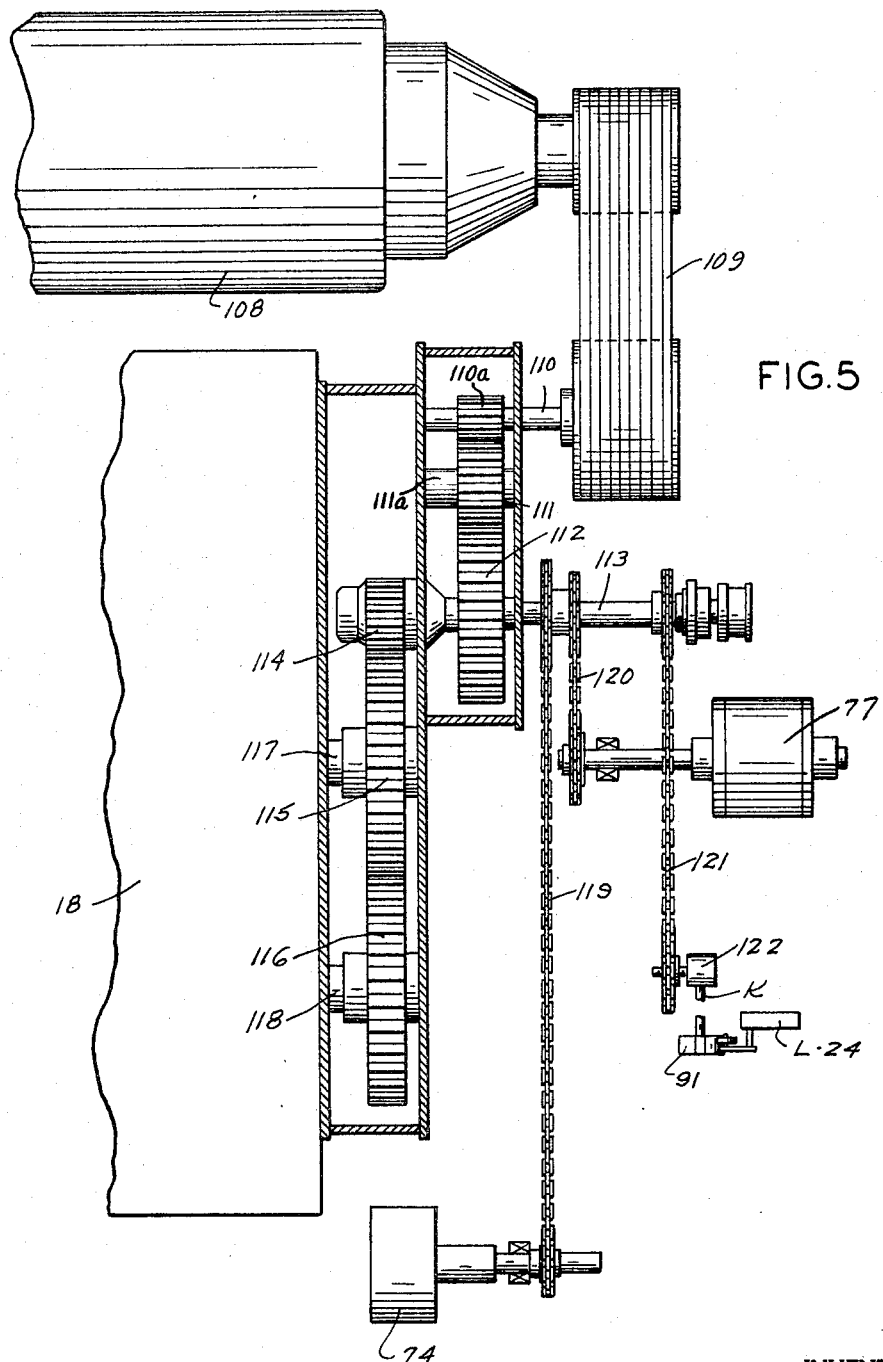
FIGURE 5 is an enlarged fragmentary partially sectioned view of the pug mill and its drive.

From a study of FIGURE 5, it will be apparent how the shaft K is interlocked with respect to the pug mill or mixer 18. The reference shaft K is interlocked with the apron feeder drive shafts 34 and 35 as well as the elevator in any conventional manner as shown in the Barber Patent 2,344,228. To this end, a motor 108 is provided having a belt drive 109 connected by means of a drive shaft 110 and gear 110a to a gear 111 mounted on shaft 111a. A second gear 112 is in mesh with the gear 111, the gear 112 being mounted on a power take-off shaft 113. One end of the power take-off shaft 113 is connected by a series of gears 114, 115, and 116 to the pug mill paddle shafts 117 and 118. The opposite end of the power take-off shaft 113 is connected by means of chain drives 119 and 120 to the transfer pump 74 and to the metering pump 77. A third chain drive 121 is connected to a right angle gear drive 122 for driving the shaft K, the cam 91, and the count switch L24. The drive to the elevator and gradation unit feeder head shafts 34 and 35 can be taken from shaft 113.

The entire purpose of this electrical circuit is to actuate the solenoid valve G1 to drive the ram and the gate to the OPEN position upon command, and to actuate the opposite end of the solenoid valve to return the gate to its original, closed position, at the end of exactly the pre-set number of revolutions of the reference shaft.

I claim as my invention:

1. In a bituminous mixing plant of the continuous type including gated aggregate bins into which aggregate is deposited and a pug mill for receiving aggregate from the bins as well as an asphalt spraying system for spraying asphalt onto the aggregate in the pug mill and a rotary reference shaft, the improvement of an aggregate discharge hopper operatively connected with the aggregate bins and with the plug mill,
gate means in the aggregate discharge hopper,
means for opening and closing said gate means to divert aggregate flow to an aggregate sample hopper,
a valve in said asphalt spraying system,
means for opening and closing said valve to divert asphalt flow to an asphalt sample hopper, and
electrical control means operatively connected to said means for opening and closing said gate means as well as to said means for opening and closing said valve for selectively diverting aggregate and asphalt flow from the pug mill to their respective sample hoppers,
said electrical control means having a dial control for diverting the aggregate and asphalt flowing to the pug mill for a dialed number of revolutions of the reference shaft whereby the number of pounds of aggregate and asphalt being delivered to the pug mill per revolution of the reference shaft may be determined.

2. In a bituminous mixing plant of the continuous type including gated aggregate bins into which aggregate is deposited and a pug mill for receiving aggregate from the bins as well as an asphalt spraying system for spraying asphalt onto the aggregate and a rotary reference shaft, the improvement of aggregate and asphalt scales,
asphalt and aggregate sample hoppers on said scales,
an aggregate discharge hopper operatively connected with the aggregate bins and with the pug mill,
gate means in the aggregate discharge hopper,
means for opening and closing said gate means to divert aggregate flow to said aggregate sample hopper,
a valve in said asphalt spraying system,
means for opening and closing said valve to divert asphalt flow to said asphalt sample hopper, and
electrical control means operatively connected to said means for opening and closing said gate means as well as to said means for opening and closing said valve for selectively diverting aggregate and asphalt to their respective sample hoppers for a selected number of revolutions of the reference shaft whereby the number of units of aggregate and asphalt being delivered to the pug mill per revolution of the reference shaft may be determined.

3. In a bituminous mixing plant of the continuous type including gated aggregate bins into which aggregate is deposited and a pug mill for receiving aggregate from the bins as well as an asphalt spraying system for spraying asphalt onto the aggregate and a rotary reference shaft, the improvement of an aggregate discharge hopper operatively connected with the aggregate bins and with the pug mill,
gate means in the aggregate discharge hopper,
means for opening and closing said gate means to divert aggregate flow to an aggregate sample hopper,
a valve in said asphalt spraying system,
means for opening and closing said valve to divert asphalt flow to an asphalt sample hopper, and
electrical control means operatively connected to said means for opening and closing said gate means as well as to said means for opening and closing said valve for selectively diverting aggregate and asphalt samples to sample hoppers for a selected number of revolutions of the reference shaft whereby the number of pounds of aggregate and asphalt being delivered to the pug mill per revolution of the reference shaft may be determined.

4. In a bituminous mixing plant of the continuous type including a pug mill and an aggregate supply system including aggregate bins for supplying aggregate to the pug mill as well as a rotating reference shaft interlocked with the system, the improvement of an aggregate discharge hopper operatively connected with the aggregate bins and with the pug mill,
gate means in the aggregate discharge hopper,
means for opening and closing said gate means to divert aggregate flow to an aggreate sample hopper, and
electrical control means operatively connected to said means for opening and closing said gate means for diverting aggregate flow to the aggregate sample hopper, said electrical control means having a dial control for diverting the aggregate flowing to the aggregate sample hopper for a dialed number of revolutions of the reference shaft whereby the number of pounds of aggregate being delivered to the pug mill per revolution of the reference shaft may be determined.

5. In a bituminous mixing plant of the continuous type including a pug mill and an asphalt supply system for supplying asphalt to the pug mill as well as a rotary reference shaft interlocked with the system, the improvement of a valve in said asphalt spraying system, means for opening and closing said valve to divert asphalt flow to an asphalt sample hopper, and
electrical control means operatively connected to said means for opening and closing said valve for diverting asphalt flowing to the pug mill to an asphalt sample hopper,
said electrical control means having a dial control for diverting the asphalt flowing to the pug mill for a dialed number of revolutions of the reference shaft
whereby the number of pounds of asphalt being delivered to the pug mill per revolution of the reference shaft may be determined.

6. In a bituminous mixing plant of the continuous type including a pug mill into which asphalt is sprayed from an asphalt spraying system including a pump having a rotary pump shaft, the improvement of
a scale,
an asphalt sample hopper on the scale,
a valve in the asphalt circulating system for diverting asphalt flowing to the pug mill to said asphalt sample hopper, and
electrical control means for connection with the rotating pump shaft and connected to said valve for diverting the asphalt flow to the asphalt sample hopper, said electrical control means having a dial control for diverting the asphalt flow to the asphalt sample hopper for a selected number of revolutions of the rotary pump shaft.

7. In a bituminous mixing plant of the continuous type including a pug mill and an aggregate supply system for supplying aggregate to the pug mill and an asphalt supply system for supplying asphalt to the pug mill as well as a reference shaft interlocked with both systems, the improvement of
electrical control means connected with the aggregate and asphalt supply systems and with the reference shaft for selectively diverting asphalt and aggregate flow from the pug mill to sample hoppers for a selected number of revolutions of the reference shaft so that the number of units of aggregate and asphalt being delivered to the pug mill may be ascertained per revolution of the reference shaft.

8. In a bituminous mixing plant of the continuous type including a pug mill and an aggregate supply system for supplying aggregate to the pug mill and an asphalt supply system for supplying asphalt to the pug mill as well as a reference shaft interlocked with both systems, the improvement of
electrical control means connected with the aggregate and asphalt supply systems and with the reference shaft for selectively diverting asphalt and aggregate flow from the pug mill to sample hoppers for one or more revolutions of the reference shaft,
said electrical control means having a dial control for diverting the aggregate and asphalt flowing to the pug mill to sample hoppers for a dialed number of revolutions of the reference shaft so that the number of pounds of aggregate and asphalt being delivered to the pug mill may be ascertained per revolution of the reference shaft.

9. In an aggregate gradation unit for a continuous type bituminous mixing plant having a rotating reference shaft, the improvement of
a discharge hopper having an aggregate receiving compartment,
said hopper having a discharge chute as well as a test chute,
a pivotally mounted aggregate flow diverting test gate disposed between said chutes,
means connected to said gate for pivoting it and closing said discharge chute to divert aggregate flow through said test chute, and
electrical control means operatively connected to said means for opening and closing said gate for diverting aggregate in the discharge chute, said electrical control means having a dial control for diverting the aggregate into the test chute for a dialed number of revolutions of the reference shaft whereby the number of pounds of aggregate being delivered through the discharge chute per revolution of the reference shaft may be determined.

10. In an aggregate gradation unit for a continuous type bituminous mixing plant, the improvement of
a feeder head shaft,
a discharge hopper having an aggregate receiving compartment,
said hopper having a discharge chute as well as a test chute,
aggregate flow diverting test gates disposed between said chutes and pivotally mounted on a pair of spaced pivot shafts,
means connected to said gate pivot shafts for pivoting the gates to divert aggregate flow through said test chute,
said gate pivot shafts being disposed at right angles with respect to said feeder head shaft and vertically in line with a center line through the feeder head shaft, and
electrical control means operatively connected to said means for opening and closing said gates for diverting aggregate flow to a sample hopper.

11. In an aggregate gradation unit for a continuous type bituminous mixing plant, the improvement of
a discharge hopper having an aggregate receiving compartment,
said hopper having a discharge chute as well as a test chute,
an aggregate flow diverting test gate disposed between said chutes and pivotally mounted on a gate pivot shaft,
means connected to said gate pivot shaft for pivoting the gate to divert aggregate flow through said test chute,
said means including a hydraulic cylinder having a double ended ram to provide equal displacement and consequently equal velocity in either directions for moving the test gate back and forth in a uniform manner for opening and closing said chutes, and
electrical control means operatively connected to said means for opening and closing said gate for diverting aggregate flow to a sample hopper.

12. In an aggregate gradation unit for a continuous type bituminous mixing plant having a rotating reference shaft, the improvement of
a feeder head shaft
a discharge hopper having an aggregate receiving compartment,
said hopper having a discharge chute as well as a test chute,
an aggregate flow diverting test gate disposed between said chutes and pivotally mounted on a gate pivot shaft, and
means connected to said gate pivot shaft for pivoting the gate to divert aggregate flow through said test chute,
said gate pivot shaft being disposed at right angles with respect to said feeder head shaft and vertically in line with a center line through the feeder head shaft,
said means including a hydraulic cylinder having a double ended ram to provide equal displacement and consequently equal velocity in either directions for moving the test gate back and forth in a uniform manner for opening and closing said chutes,
electrical control means operatively connected to said means for opening and closing said gate for diverting aggregate flow to a pug mill,
whereby the number of pounds of aggregate being delivered through the discharge chute per revolution of the reference shaft may be determined.

13. In an aggregate gradation unit for a continuous type bituminous mixing plant having a rotating reference shaft, the improvement of
a discharge hopper having an aggregate receiving compartment,
feeder means for supplying aggregate to said discharge hopper,
said hopper having a discharge chute as well as a test chute, a pivotally mounted aggregate flow diverting test gate disposed between said chutes, means connected to said gate for pivoting it closing said discharge chute to divert aggregate flow through said test chute, electrical control means operatively connected to said means for opening and closing said gate for diverting aggregate flow to a sample hopper, said electrical control means having a dial control for diverting the aggregate flowing through the discharge chute for a dialed number of revolutions of the reference shaft, and means for opening and closing said test gate while said feeder means is shut down.

14. In a bituminous mixing plant of the continuous type including a pug mill and an asphalt supply system for supplying asphalt to the pug mill as well as a rotary reference shaft interlocked with the system, the improvement of a valve in said asphalt supply system, means for opening and closing said valve to divert asphalt flow to an asphalt sample hopper, electrical control means operatively connected to said means for opening and closing said valve for diverting asphalt flowing to the pug mill to an asphalt sample hopper, said electrical control means having a dial control for diverting the asphalt flowing to an asphalt sample hopper, for a dialed number of revolutions of the reference shaft, and means in the asphalt supply system for emptying the asphalt from an asphalt sample hopper and returning the asphalt to the system.

15. In a bituminous mixing plant of the continuous type including a pug mill and an aggregate supply system for supplying aggregate to the pug mill and an asphalt supply system for supplying asphalt to the pug mill as well as a reference shaft interlocked with both systems, the improvement of means connected with the aggregate and asphalt supply systems and with the reference shaft for selectively diverting asphalt and aggregate flow from the pug mill to sample hoppers for a selected number of revolutions of the reference shaft so that the number of units of aggregate and asphalt being delivered to the pug mill may be ascertained per revolution of the reference shaft.

16. In an aggregate gradation unit for a bituminous mixing plant, of the continuous type, the improvement of a feeder head shaft, a discharge hopper having an aggregate receiving compartment, said hopper having a discharge chute as well as a test chute, aggregate flow diverting test gates disposed between said chutes and pivotally mounted on a pair of spaced pivot shafts, and means connected to said gate pivot shafts for pivoting the gates to divert aggregate flow through said test chute, said gate pivot shafts being disposed at right angles with respect to said feeder head shaft and vertically in line with a center line through the feeder head shaft.

17. The gradation unit of claim 16 further characterized by said means including a hydraulic cylinder having a double ended ram to provide equal displacement and consequently equal velocity in either directions for moving the test gates back and forth in a uniform manner for opening and closing said chutes.

References Cited by the Examiner
UNITED STATES PATENTS

| | | | |
|---|---|---|---|
| 2,344,228 | 3/1944 | Barber | 222—136 X |
| 2,727,669 | 12/1955 | Sackett | 222—70 X |
| 2,756,104 | 7/1956 | Heise | 222—318 |
| 2,787,450 | 4/1957 | Wylie | 222—318 X |
| 2,873,955 | 2/1959 | Sauer | 259—154 |
| 2,893,600 | 7/1959 | Barber et al. | 222—318 X |
| 2,893,601 | 7/1959 | Barber et al. | 222—318 X |
| 2,893,602 | 7/1959 | Barber et al. | |

FOREIGN PATENTS

| | | |
|---|---|---|
| 469,275 | 11/1950 | Canada. |
| 636,397 | 1/1928 | France. |

MORRIS KAPLAN, *Primary Examiner.*

RICHARD D. NEVIUS, WILLIAM D. MARTIN,
*Examiners.*

J. A. HAUG, JOSEPH B. SPENCER,
*Assistant Examiners.*